(12) United States Patent
Haag

(10) Patent No.: US 7,404,934 B2
(45) Date of Patent: Jul. 29, 2008

(54) DEVICE FOR TREATING WASTE GASES RESULTING FROM TECHNICAL COMBUSTION PROCESSES

(75) Inventor: Klaus Haag, Ketsch (DE)

(73) Assignee: Drafas GmbH, Helmstadt-Bargen (DE)

( * ) Notice: Subject to any disclaimer, the term of this patent is extended or adjusted under 35 U.S.C. 154(b) by 695 days.

(21) Appl. No.: 10/380,380

(22) PCT Filed: Sep. 12, 2001

(86) PCT No.: PCT/EP01/10543

§ 371 (c)(1),
(2), (4) Date: Dec. 17, 2003

(87) PCT Pub. No.: WO02/23019

PCT Pub. Date: Mar. 21, 2002

(65) Prior Publication Data

US 2004/0096371 A1    May 20, 2004

(30) Foreign Application Priority Data

Sep. 14, 2000    (DE) ................. 100 45 342

(51) Int. Cl.
  *B01D 53/34*    (2006.01)
  *B01D 53/92*    (2006.01)
  *B01D 50/00*    (2006.01)
(52) U.S. Cl. .............. 422/180; 422/177; 422/900
(58) Field of Classification Search .......... 422/171, 422/177, 180, 181, 211, 900
See application file for complete search history.

(56) References Cited

U.S. PATENT DOCUMENTS

| 2,075,758 | A |   | 3/1937  | Freund ............... 181/46 |
| 4,940,476 | A |   | 7/1990  | Buck ................. 55/486 |
| 5,190,571 | A | * | 3/1993  | Fay et al. ........... 55/523 |
| 5,266,279 | A | * | 11/1993 | Haerle .............. 422/177 |
| 5,458,664 | A | * | 10/1995 | Ishii et al. ......... 55/282 |

FOREIGN PATENT DOCUMENTS

| AT | 397694   |   | 6/1994  |
| AT | 397694 B | * | 6/1994  |
| DE | 3731766  |   | 3/1989  |
| EP | 0446422  |   | 9/1991  |
| EP | 0437685  |   | 8/1994  |
| EP | 0505832  |   | 6/1995  |
| GB | 2256006  |   | 11/1992 |
| JP | 6011796  |   | 1/1985  |

* cited by examiner

Primary Examiner—Glenn Caldarola
Assistant Examiner—Randy Boyer
(74) Attorney, Agent, or Firm—Davidson, Davidson & Kappel, LLC

(57) ABSTRACT

The invention relates to a device for treating exhaust gases, which can be arranged in the exhaust-gas stream from an internal combustion engine or in the exhaust-gas line from stationary combustion installations and which has a feed-line connection stub and a discharge-line connection stub. Feed-line connection stub (3) and discharge-line connection stub (4) are held on the housing (6) which contains a filter material which has at least one fabric layer made from metal wires or metal fibers. For diversion, for retention of particulates from the in the incoming exhaust-gas stream (1) and for muffling in the exhaust-gas stream and for purification of exhaust gases, in the housing (6) there are shaped bodies (8) which consist of metallic materials (19.1, 19.2) as composite material (19), the empty spaces (11, 16, 17) which are present in the housing (6) being filled with metallic fiber material.

11 Claims, 2 Drawing Sheets

DEVICE FOR TREATING WASTE GASES RESULTING FROM TECHNICAL COMBUSTION PROCESSES

Figure 1:
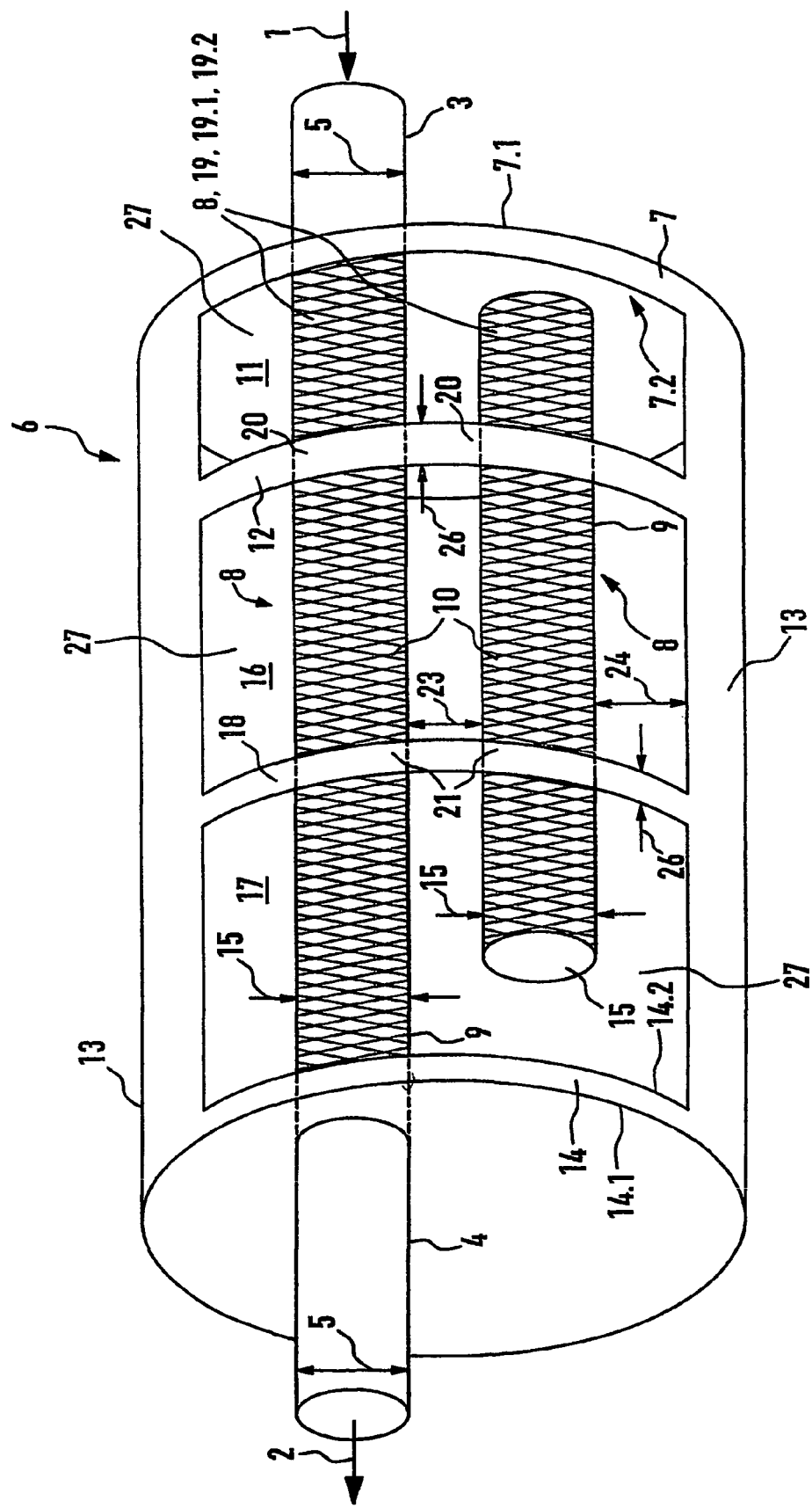

The invention relates to a device for treating exhaust gases which are formed in industrial and technical combustion processes, for example exhaust gases from internal combustion engines, exhaust gases from incineration operations or other industrial applications.

EP 0 505 832 B1 relates to a filter or catalyst support. It proposes a filter or catalytic converter body for eliminating harmful constituents from the exhaust gases from an internal combustion engine, in particular a diesel engine. This includes at least one fabric layer comprising metal wires or metal fibers, sinterable material in powder, grain, fiber fragment or chip form being introduced into the meshes and sintered onto the wires or fibers. The fabric is formed as a three-dimensional wire fabric, in the meshes of which sinterable material is introduced and sintered to the wires or fibers.

DE 37 31 766 C2 discloses a particle filter. The particle filter is arranged in the exhaust-gas stream from an internal combustion engine, in particular an air-compressing internal combustion engine, and includes a housing which has a feed-line connection stub and a discharge-line connection stub for the exhaust-gas stream and in which there is arranged a filter material which includes knitted fibers and mineral filaments or yarns and is in multilayer form. The filter is formed at least in part or completely by a knitted fabric which has been circular-knitted from the mineral filaments or yarns.

EP 0 446 422 A1 has disclosed a particle filter for an air-compressor internal combustion engine. This document proposes a particle filter for diesel engines having an inlet for the introduction of exhaust gases, an outlet and a filter zone which lies between inlet and outlet and includes a multiplicity of tubular, porous ceramic filter candles or filter cylinders, the exhaust gas entering radially through the cylindrical walls of these filter candles or filter cylinders and the exhaust gas emerging again in the axial direction through the axial interior space of these filter candles or filter cylinders. The porous ceramic filter candles or filter cylinders are mounted elastically and sealed in the axial direction by means of a disk and in the radial direction by means of a sleeve made from knitted, braided or woven metal fabric at their ends.

Finally, EP 0 437 685 B1 has disclosed a particle filter. The particle filter for separating particulates out of the exhaust gases from an internal combustion engine has a temperature-stable, porous metallic filter body made from a metallic material with intermetallic phases of Ni, Al or $Ni_3Al$, the filter body of the particle filter being produced by sintering. The filter body comprises a braided wire fabric, metals or metal compounds being admixed with the material in order to improve the sintering properties.

In previous systems for treating exhaust gases in the automotive sector, for example in exhaust muffling, the reflection principle has been used, in which muffling is brought about in the exhaust, whether this be in the front muffler or in the main muffler, as a result of the exhaust-gas stream being diverted and broken up by means of a multichamber system. With the absorption principle, the muffling is effected by means of fillers made from a very wide range of materials. In general, the diversion of the exhaust-gas streams in a muffler system is effected by perforated metal sheets in a very wide range of forms, whether as tubes or as stamped parts. A relatively rigid inner structure of the exhaust muffler is produced from the abovementioned components by folding, welding or some other joining or connecting step. The empty spaces which result after the internal structure comprising stamped parts and tubes has been put inside a casing are filled with a very wide range of filler materials, whether mineral wool (basalt) or glass wool. Stainless steel wool is used, for example, as a heat distributor and heat protection for the other fillers, first high sound frequencies of the incoming exhaust-gas stream being broken up by the stainless steel wool.

The absorption principle, which has mainly been followed by previous muffler structures, has the associated drawback that, on account of the perforation or stamping of the parts which form the internal structure of the muffler, it is very material-consuming and expensive, since a very wide range of expensive tools are required to stamp, perforate, drill and weld and the quantity of waste is not inconsiderable. The same is also true with regard to the construction of catalytic converters for purifying exhaust-gas streams from internal combustion engines. Shaping the perforated metal sheets according to individual muffler designs requires a type-specific configuration of the components and is associated with a high level of outlay and considerable cost caused by sizing, stamping and stock-holding. Furthermore, the production of a composite structure which is incorporated in skeleton form in the housing of a muffler, whether this be a main muffler or a front muffler, is extremely labor-intensive, and furthermore the construction which emerges has a high intrinsic weight. By contrast, in the automotive sector the trend is toward ever more lightweight structures. The empty spaces in a muffler provided with a skeleton-like structure are nowadays usually filled with mineral wool and ceramic and further materials. However, this makes it impossible to make the exhaust muffler recyclable, since for it to be recycled, i.e. melted down, the mineral wool or ceramic constituents must first be removed from the interior of the exhaust muffler to enable the remainder to be completely melted down.

In view of the solutions to an exhaust-gas treatment device which are shown in the prior art and the drawbacks which have been demonstrated in muffler configurations which have been disclosed hitherto, the invention is based on the object of considerably simplifying the production of a system for exhaust-gas treatment, whether this be a muffler system or a particle filter system, or in exhaust-gas catalytic converters for purifying exhaust-gas streams, and of improving the recyclability thereof.

According to the invention, this object is achieved through the fact that, in a device for treating exhaust gases which is arranged in the exhaust-gas stream from an internal combustion engine and which has a feed-line connection stub and a discharge-line connection stub, both of which are held on a housing which contains a filter material which has at least one fabric layer made from metal wires or metal fibers, for diversion, for retention of particulates contained in the exhaust gas and for muffling, shaped bodies are incorporated in the housing, which shaped bodies, made from metallic fiber material, fill the empty spaces in the housing of the device for the treatment of exhaust gases.

The advantages which can be achieved with the solution which is proposed in accordance with the invention are considered to reside in particular in the fact that the shaped bodies which are provided inside the housing of the device for treating the exhaust-gas streams can be designed with simple means and have huge flexibility in terms of their geometries. By way of example, the shaped bodies may be configured in such a way that they pass through the housing of the particle filter or of the exhaust-gas catalytic converter or of the muffler in the axial direction, i.e. parallel to the direction of flow of the exhaust-gas streams to be treated, can be arranged so as to wind helically through the interior of the housing, but can also pass through the housing in meandering form, so that the exhaust-gas stream can be forced to cover a long path through the housing. In addition, other exhaust-gas stream configurations which lengthen the path of the gas stream passing through the housing are also conceivable. In addition, this type of configuration of a muffler system, a catalytic converter system or a particle filter system is also significantly more favorable in terms of its intrinsic weight than a comparable structure using perforated or unperforated metal sheets. The metallic composite material used may consist of stainless steel wool or other metal fibers with a large surface area which are incorporated in a woven mesh which serves as support material. As a result, all individual shaped parts made from metal sheets and by separate installation in the interior of the housing of the catalytic converter, muffler or particle filter system can be dispensed with.

In an advantageous configuration of the device which is proposed in accordance with the invention, the metallic composite material consists of a woven mesh which functions as a support material and metallic fibers which are introduced into it. The metallic fibers offer the advantage of dissipating the heat which is carried in the incoming exhaust-gas stream as quickly as possible and have a large surface area, which is favorable with a view to particulate retention when used in a particle filter system.

The shaped bodies which consist of the metallic composite material and are incorporated in the interior of the housing are extremely flexible to produce, production being particularly simple. The shaped bodies, if they consist exclusively of metallic base material, have a porosity which can be adjusted according to the way in which they are produced. The porosity has a decisive influence on the rate of flow of the exhaust gas through the muffler or particle filter which is configured in accordance with the invention, and consequently the residence time of the exhaust-gas stream in the interior of a catalytic converter, a particle filter or a muffler can be influenced by the way in which the individual materials are pressed in the metallic composite materials.

According to an advantageous design variant of the device for treating exhaust-gas streams which has been proposed in accordance with the invention, shaped bodies for treating the gas streams which are fitted into the interior of the housing can be arranged parallel to the direction of flow of the exhaust-gas streams. It is possible to produce the various exhaust-gas flow paths through the interior of a device for treating exhaust gas, whether this be a particle filter, a catalytic converter for purifying exhaust gas or a muffler. It is irrelevant whether it be one, two or more along, parallel to the axis of symmetry of a housing which is made in a round, oval or any other geometry. In addition to a coaxial extent of the shaped body made from metallic composite material, it is also readily possible to propose a meandering extent of the shaped bodies made from metallic fiber material through the interior of the housing, with the result that the residence time of the exhaust gas guided in the shaped bodies in the interior of the housing of the muffler, the catalytic converter or the particle filter can be lengthened or influenced in a targeted way.

In addition to the coaxial forming of the shaped parts or an adjustable meandering profile of the shaped parts in the interior of the housing, it is also possible to provide a shape-part geometry which is configured helically—in the form of a coil spring—and which runs in the interior of the housing at a short distance from the outer shell of this housing. The lengthening of the shaped parts, i.e. an increase in the path length, forces the exhaust gas to cover a longer distance through the interior of the housing, with the result that, first of all, its residence time in the interior of the housing can be adjusted and thereby the particulate retention can be improved and, secondly, a greater dissipation of heat to the outer surface of the housing can be established.

In a further configuration of the device which is proposed in accordance with the invention, metallic fiber material is enclosed in the empty spaces, i.e. the spaces in the interior of the housing which do not hold shaped parts made from metallic composite material. In this way, it is possible to produce a low-vibration bearing of the shaped parts made from metallic composite material, and also uniform heating or heat distribution in the interior of the housing. In an advantageous design option for the device which is proposed in accordance with the invention, whether this be a particle filter, a muffler or an exhaust-gas catalytic converter for use in the automotive sector, the proportion of stainless steel material in the metallic composite material can be significantly higher in the region of the inlet end face for entry to the housing than the stainless-steel proportion arranged on the outlet side of the housing, in order for heat to be dissipated from the incoming exhaust-gas stream.

The device for treating gas streams can be used both in the muffler system, whether this be the main muffler or the front muffler, in the motor vehicle as a particle filter element for retaining soot particles in commercial vehicles or in passenger automobiles, and furthermore a configuration which is proposed in accordance with the invention for treatment of exhaust gas can also be used as a catalytic converter for purifying exhaust gases from internal combustion engines. Furthermore, the solution according to the invention can also be used in stationary combustion installations used in the industrial and domestic sectors.

In the configuration whereby the device which is proposed in accordance with the invention is used for the retention of particulates, i.e. as a particle filter, the particulate retention, i.e. the efficiency of the cleaning of the exhaust-gas stream, can be significantly increased as a result of, firstly, a long residence time, i.e. a long path length through the interior of the housing, being imposed upon on the incoming particle-laden exhaust-gas stream from an air-compressing internal combustion engine. Furthermore, if, in the case of particle filters, a considerable degree of pressing or knitting-together of the two metallic composite materials is established during production of the metallic composite material, a porosity which significantly improves the retention of particulates from the exhaust-gas stream is established in the metallic composite material which virtually completely fills the interior of the housing.

Figure 2:
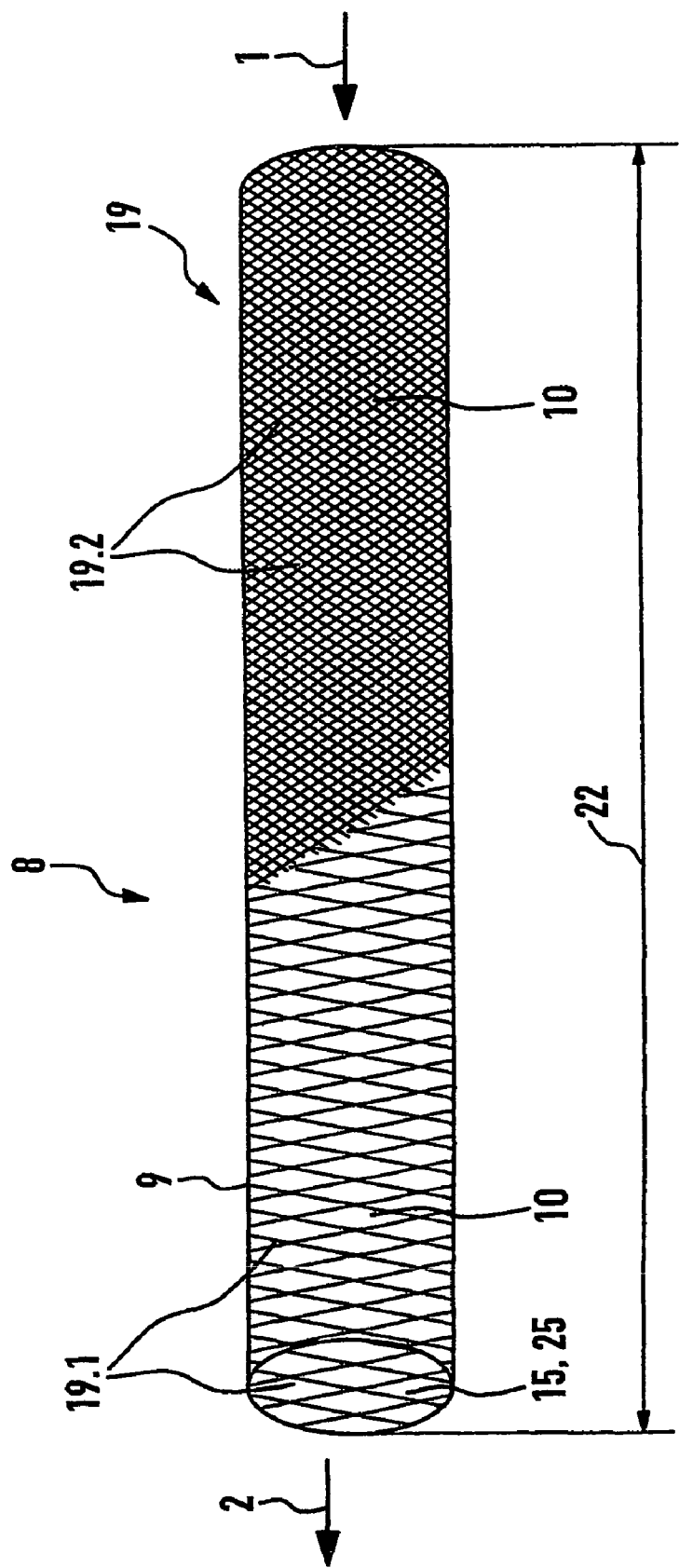

The invention is described in more detail with reference to the drawing, in which:

FIG. 1 shows a cross section through a partially open housing of a device for treating exhaust gases, with shaped bodies diagrammatically depicted therein, and FIG. 2 shows an axially extending shaped body of simpler geometry made from metallic composite material.

The illustration shown FIG. 1 shows a device for treating an exhaust-gas stream, for example a muffler device at internal combustion engines, in diagrammatic form.

It can be seen from the illustration presented in FIG. 1 that an incoming exhaust-gas stream 1 from an internal combustion engine, whether this be a gasoline-burning internal combustion engine or an air-compressing internal combustion engine, enters the interior of a housing 6 of a device for treating the exhaust-gas stream 1 through an inlet connection stub 3.

In the configuration shown in FIG. 1, the stub diameter 5 substantially corresponds to the diameter of the shaped body 8 which is incorporated in the interior of the housing 6, consists of a metallic composite material 19 and two of which are shown in the illustration presented in FIG. 1, extending substantially parallel to the axis of symmetry of the housing 6. The inlet connection stub 3 is secured to the outer side 7.1 of an inlet end side 7 of the housing 6 of the device for treating the exhaust-gas stream. The inlet connection stub opens out, through an opening, directly into the shaped body 8 which is provided in the interior of the housing 6 and passes through the first empty space 11 and further empty spaces 16 and 17.

On the outlet side of the housing 6 there is an outlet connection stub 2, which is secured to the outer side 14.1 of the outlet end side 14 and which is designed in a similar way to the inlet connection stub 3 in terms of stub diameter 5, substantially corresponding to the external diameter 15 of the shaped body made from metallic composite material 19. A correspondingly treated exhaust-gas stream 2 leaves the interior of the housing 6 through the outlet connection stub 2. The housing 6 may be part of a muffler installation, or alternatively an installation for purifying the exhaust gases, whether this be a particle filter or an exhaust-gas catalytic converter as is nowadays used in the automotive industry.

In addition to the end faces 7 and 14, the housing 6 comprises an outer shell 13 which extends cylindrically around the end sides 7 and 14. Between the end sides 7, 14, individual empty spaces 11, 16 and 17 are formed in the interior of the housing 6, divided up by wall elements 12, 18. The above-mentioned empty spaces in the interior of the housing 6 are filled with filler material, which is metallic fiber material, in order to improve the muffling, for example in muffler systems, and the heat conduction for hot incoming exhaust-gas streams 1.

In the illustration shown in FIG. 1, the shaped bodies 8, of which two are illustrated by way of example, are shown running substantially coaxially with respect to the geometry line of the housing 6. Compared to the upper shaped body 8 accommodated in the housing 6, which is held substantially coaxially with respect to the inlet and outlet connection stubs 3, 4, a further shaped body 8, which is only represented in broken-away form, is located parallel to the shaped body 8 which connects the connection stubs 3 and 4 to one another, in the interior of the housing 6. In addition to the geometry of the shaped bodies 8 which is illustrated here, these shaped bodies may also adopt a meandering path through the interior of the housing 6, in order to impose a longer path length through the interior of the housing 6 to the incoming exhaust-gas stream 1 and to increase its residence time in the interior of the housing 6. A longer residence time in the interior of the housing 6 of the device for treating exhaust-gas streams allows the temperature of the incoming exhaust-gas stream 1 to be reduced further and allows an improved retention result in particle filter arrangements with regard to the retention rate of the soot particles contained in the exhaust gas from an air-compressing internal combustion engine.

In addition to the shaped bodies being guided in meandering form through the interior of the housing 6, they can also be led through the interior of the housing 6 in the manner of a coil spring in individual turns running along the outer shell 13 of the housing 6. This has the advantage that, in addition to good heat transfer to the outer surface of the housing 6, the longest possible residence time in the interior of the housing 6 is imparted to the incoming exhaust-gas stream 1, which in the case of an air-compressing internal combustion engine has the associated positive effect that the particulates contained in the exhaust gas can be filtered out as fully as possible.

In the exemplary embodiment illustrated in FIG. 1, the shaped bodies 8 are illustrated passing through the individual walls 12, 18 in the region of openings 20 and 21, respectively. The shaped bodies 8 consist of metallic fiber composite material comprising the components 19.1 and 19.2. Reference numeral 19.1 denotes the woven mesh, which functions as a support material and the meshes of which may be of different sizes and may adopt any desired geometries and may have a metallic fiber material, for example stainless steel wool, incorporated in them. The shaped bodies 8, which are in this case configured in rod form, are in each case surrounded on their outer surfaces 9 by filler material, which is preferably metallic fiber material. Therefore, the interior of the housing 6 consists entirely of metallic material, which has a favorable effect on its recyclability, since there is now no need to separate different materials, such as for example ceramic, glass fibers, mineral wool, when the device for treating exhaust-gas streams which is configured in accordance with the invention is being reused. It is now possible to dispense with separate disposal of mineral or glass wool which was incorporated in the empty spaces 11, 16, 17 as filler materials in previous configurations; this has a beneficial effect on the recyclability of the device which is proposed in accordance with the invention, whether it is used a as muffler, as a particle filter or as an exhaust-gas catalytic converter.

It can be seen from the illustration presented in FIG. 1 that the shaped parts 8, which can easily be produced in very complex geometries, are arranged at a distance, which is denoted by reference symbol 23, from one another in the interior of the housing 6. The individual shaped parts in the interior of the housing 6, surrounded by the outer surface 13, can be arranged at a greater distance 24 from this outer surface. The quantity of filler material, which is preferably metallic fiber material, which is to be arranged in this region is determined by the distance 24 between the outer surface of the shaped bodies 8 made from metallic composite material 19 and the inner wall of the outer shell 13 of the housing 6. The heat transfer from the exhaust gas flowing through the shaped bodies 8 to the outer side of the lateral surface 13 of the housing 6 can be influenced in this way. In addition to the flow of the incoming exhaust-gas stream 1 being guided in meandering or helical form through the shaped bodies 8, which are made from metallic composite material 19 and have extremely complex geometries, the heat transfer from the incoming exhaust-gas stream 1 to the lateral surface 13 of the housing 6 can also be predetermined by the shaped bodies made from metallic composite material being spaced apart at a spacing 24 which can be preselected.

In order to take account of the high temperatures at which the incoming exhaust-gas stream 1 enters the interior of the housing 6 through the inlet connection stub 3, there may be a high stainless steel content in the region of the inlet-side end face 7 and in the shaped bodies 8, which consist of metallic composite material 19, and filler materials surrounding them in the first empty space 11, which ensures better dissipation of heat. The proportion of stainless steel in the metallic composite material may be lower at the outlet-side end face 14 of the housing 6, since the outlet temperature of gas stream 2 emerging from the interior of the housing 6 of the device for treating exhaust-gas streams is generally lower than the inlet temperature of the incoming, as yet untreated exhaust-gas stream 1. Although it has been illustrated on the basis of a muffler for exhaust-gas streams, the structure of a catalytic converter for purifying exhaust gases or the structure of a particle filter for filtering out particulates is also constructed in a similar manner to the muffler sketched in FIG. 1.

The illustration shown in FIG. 2 presents a shaped-body component 8, which is only diagrammatically depicted in the figure, in more detail.

The shaped-body component 8 consists of metallic composite material 19 which is pressed or knitted together, and the porosity of which can in this way be influenced in terms of the ability of exhaust-gas streams to pass through it. The composite material 19 firstly includes a woven mesh 19.1 which serves as a support fabric and may have a mesh width and any desired mesh geometry, be they round, polygonal, diamond-shaped or the like. Metallic fibers 19.2 which, by way of example, may be melted or produced by chip-forming routes, are incorporated in the individual meshes present in the support material 19.1. The two materials 19.1 and 19.2 can be pressed or knitted together or joined to one another in any other conceivable way, so that a composite material is produced. The particulate retention rate, for example the retention rate for soot particles from the exhaust gas from air-compressing internal combustion engines, can be positively influenced according to the porosity, which is established by the degree of pressing or knitting-together of the metallic composite materials 19.1 and 19.2. If, during filtering, the residence time is selected by means of a helical or meandering guidance of the exhaust-gas flow through the interior of the housing 6 and the porosity in the shaped body 8 is selected favorably, it is possible to achieve a significant particulate retention rate in the exhaust-gas stream from an air-compressing internal combustion engine (not shown here) using a particle filter, or exhaust-gas catalytic converter, of this type consisting of purely metallic material. In addition, a particle filter system or catalytic converter system of this type can be disposed of very easily, since it consists exclusively of metallic materials and can therefore easily be melted down. With a particle filter of this type, it is not necessary to separate different materials, such as glass wool, mineral wool or ceramic materials. Even when the device which is proposed in accordance with the invention for treating exhaust gas is used as a particle filter or an exhaust-gas catalytic converter, it is possible to implement a stainless-steel material distribution in the interior of the housing which takes account of the temperature profile of the incoming exhaust-gas stream 1. For example, even with particle filters or catalytic converters, it is possible to provide a higher stainless steel content, in order to improve the conduction of heat, in the region of the empty spaces 11 which lie closest to the inlet-side end side 7 of the housing 8 than at the outlet-side end side 14 at the housing 6 of the device for treating exhaust-gas streams 1. The remaining empty spaces 11, 16 and 17 of the housing can be filled, for example, with stainless steel wool, since this material, unlike the abovementioned glass wool or mineral wool materials, can be recycled and there is no need for separation operations.

The illustration presented in FIG. 2, which illustrates the direction of flow through the shaped body 8 by means of the incoming exhaust-gas stream 1 and the emerging, treated exhaust-gas stream 2, takes place via the cross-sectional area 15, which in the exemplary embodiment illustrated in FIG. 2 is of approximately circular configuration. The porosity which is predetermined by the production of the shaped body 8 and leads to the favorable results with regard to the retention of soot particles in the exhaust gas from air-compressing internal combustion engines is established in the inner region 10 of the shaped body 8 consisting of metallic composite material 19.

Although this is not illustrated in FIG. 2, the outer lateral surface 9 of the shaped body 8 is surrounded by filler material, which is likewise metallic composite material 19 and which is accommodated in the empty spaces 11, 16, 17 (cf. FIG. 1) of the housing 6 of the device for treating exhaust-gas streams for muffling purposes. In addition to the muffling action, the filler material 19 also makes it possible to improve the conduction of heat and the heat transfer from the hot exhaust-gas streams which are present on the inlet side to the outer lateral surface 13 of the housing 6.

The configuration of a device for treating exhaust gas which is proposed in accordance with the invention enables this device, in the form of a pot-like housing, to be made completely from metal, which improves its recyclability and obviates the need for separation operations to separate different materials. The intrinsic weight of the configuration of a device for treating exhaust-gas streams which is proposed in accordance with the invention is significantly reduced compared to the conventional skeleton structures comprising perforated metal sheets and tubes, and furthermore the labor-intensive and cost-intensive skeleton structure as has hitherto been customary in mufflers, particle filters or exhaust-gas catalytic converters can then be dispensed with altogether. It is now also possible to completely dispense with holding stocks of a very wide range of different perforated metal sheet configurations for model-specific muffler configurations for motor vehicles.

| List of reference symbols | |
|---|---|
| 1 | Incoming exhaust-gas stream |
| 2 | Emerging exhaust-gas stream |
| 3 | Inlet connection stub |
| 4 | Outlet connection stub |
| 5 | Connection stub diameter |
| 6 | Housing |
| 7 | Inlet end side |
| 7.1 | Outer side |
| 7.2 | Inner side |
| 8 | Shaped body |
| 9 | Outer shell |
| 10 | Inner region |
| 11 | Empty space |
| 12 | Wall |
| 13 | Lateral surface |
| 14 | Outlet end side |
| 14.1 | Outer side |
| 14.2 | Inner side |
| 15 | Shaped body cross section |
| 16 | Empty space |
| 17 | Empty space |
| 18 | Wall |
| 19 | Metallic composite material |
| 19.1 | Support fabric |
| 19.2 | Support fabric + metal fibers |
| 20 | Passage opening in wall 12 |
| 21 | Passage opening in wall 18 |
| 22 | Shaped body length |
| 23 | Spacing |
| 24 | Lateral surface spacing |
| 25 | Passage area |
| 26 | Wall thickness |
| 27 | Filler material for empty spaces 11, 16, 17 |

The invention claimed is:

1. A device for treating exhaust gases (1) which is arranged in the exhaust-gas stream from an internal combustion engine or in the exhaust-gas line from stationary combustion installations and which has a feed-line connection stub (3) and a discharge-line connection stub (4), which are held on a housing (6) which contains a filter material (19) which has at least one fabric layer made from metal wires or metal fibers, characterized in that for diversion, particulate retention and muffling purposes there are shaped bodies (8) in the housing (6), which consist of metallic fiber composite (19.1, 19.2) as composite material, the empty spaces (11, 16, 17) in the housing (6) being filled with metallic fiber material, wherein in a region of an inlet end face (7) of the housing (6) the proportion of stainless steel material (19.2) in the composite material (19) is higher than at the outlet-side boundary (14) of the housing (6), in order to conduct heat out of the incoming exhaust-gas stream (1).

2. The device as claimed in claim 1, characterized in that the composite material (19) comprises a woven mesh (19.1), which serves as a support fabric, and metallic fibers (19.2) which are introduced into this woven mesh.

3. The device as claimed in claim 1, characterized in that the shaped bodies (8) which are incorporated in the interior of the housing (6) for treating the gas streams (1, 2) are arranged parallel to the direction of flow of the exhaust-gas streams (1, 2).

4. The device as claimed in claim 1, characterized in that the shaped bodies (8) adopt a meandering path through the interior of the housing (6).

5. The device as claimed in claim 1, characterized in that the shaped bodies (8) are arranged so as to run helically through the interior of the housing (6).

6. The device as claimed in claim 1, characterized in that the empty spaces (11, 16, 17) in the housing (6) are filled with metallic fiber material as filler material.

7. The device as claimed in claim 1, characterized in that it is used as a main and/or front muffler in an exhaust system.

8. The device as claimed in claim 1, characterized in that it is provided as a particle filter for retaining particulates from the exhaust-gas stream (1) which enters it.

9. The device as claimed in claim 8, characterized in that the retention of particulates by the shaped bodies (8) can be influenced by their longitudinal extent (22), their passage surface area (25) and the by the porosity of the metallic composite material (19) of the bodies (8).

10. The device as claimed in claim 1, characterized in that it is used as an exhaust-gas catalytic converter for purifying exhaust-gas streams.

11. The device as claimed in claim 1 wherein the entire housing is made of metallic material.

* * * * *